R. MILLER.
ANIMAL STALL.
APPLICATION FILED DEC. 5, 1919.
1,373,904.
Patented Apr. 5, 1921.
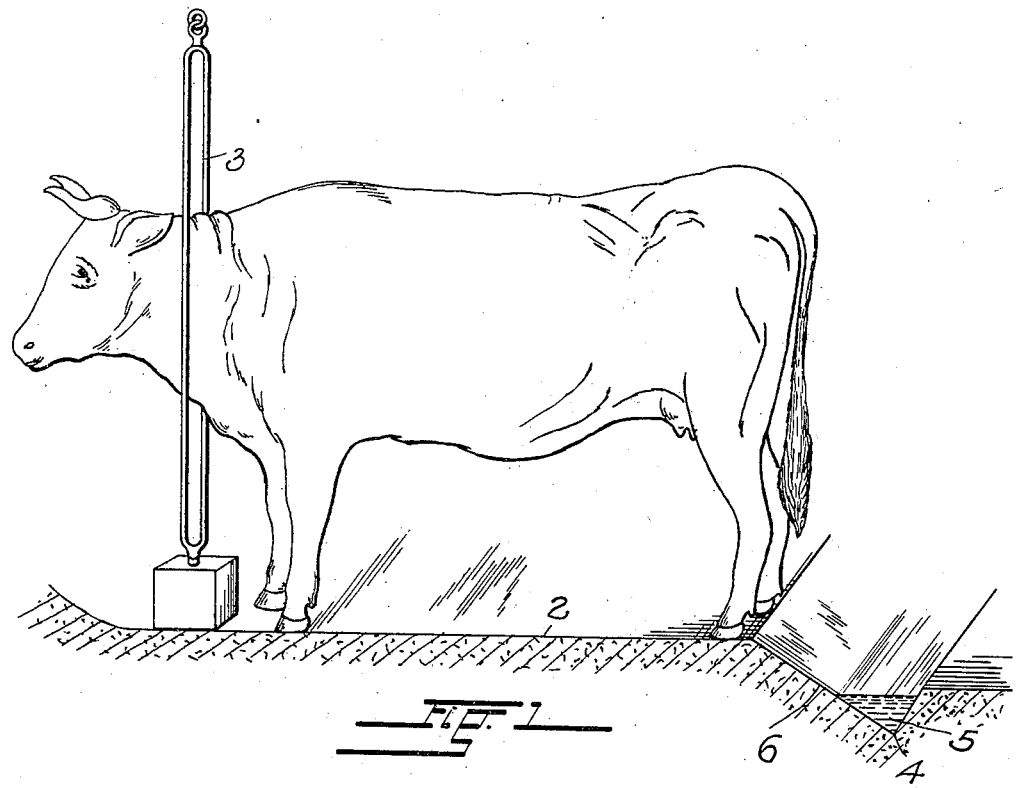
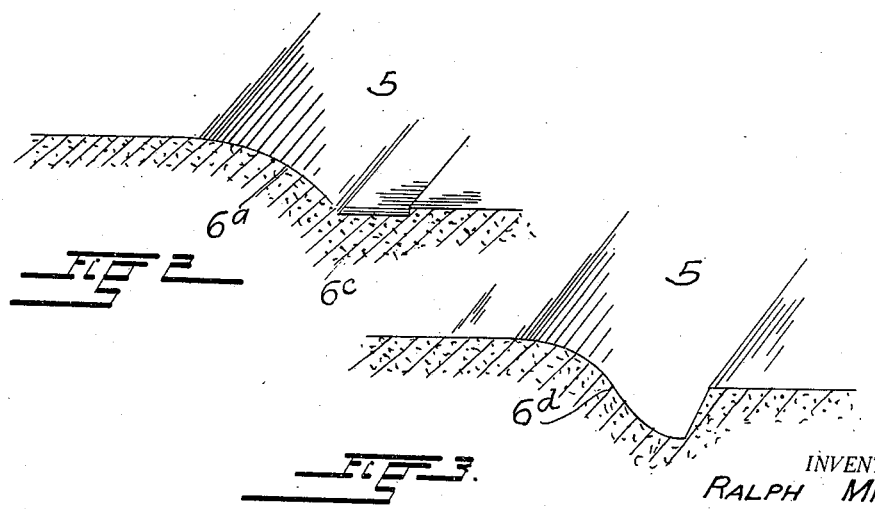
INVENTOR.
RALPH MILLER.
BY
ATTORNEY.

UNITED STATES PATENT OFFICE.

RALPH MILLER, OF BOULDER, COLORADO.

ANIMAL-STALL.

1,373,904.   Specification of Letters Patent.   Patented Apr. 5, 1921.

Application filed December 5, 1919.   Serial No. 342,667.

*To all whom it may concern:*

Be it known that I, RALPH MILLER, a citizen of the United States, residing at Boulder, in the county of Boulder and State of Colorado, have invented certain new and useful Improvements in Animal-Stalls, of which the following is a specification.

This invention relates to stalls for animals and its primary object is to provide in connection with the floor surface of a stall of the type used in dairies for keeping milch cows, a gutter for refuse matter, which is of economical, practical and highly sanitary construction and which effectively prevents the animal from fouling itself or the bed-floor of the stall.

With this object in view, the gutter which as usual runs along the rear ends of a series of stalls in a barn, stable or other shelter, comprises a sunken trough and a sloping surface which connects the trough with the floor surface of the stall.

The trough or bottom portion of the gutter is positioned out of reach of the animals secured by stanchions at the head ends of the stalls, against excessive backward movement, and the sloping surface of the same is arranged to receive the excrement of the animals and conduct it to the trough.

The advantages of a gutter thus formed will be readily apparent to those familiar with the construction of cow barns and stables and the habits of the animals kept therein.

The construction of a gutter formed in accordance with the present invention is very simple and economical especially where the floor of the stalls is made of cement or other plastic material and it permits of the penetration of sun rays to every part of its contents, thereby preventing the development of bacteria.

The sloping surface of the gutter discourages backward movement of the animals within the limits of their stanchions and positively prevents their stepping into the refuse matter and carrying it onto the floor or bed of the stalls.

The inclined surface of the gutter furthermore causes the falling excrement to spatter away from the animals, which, especially in milch cows, is of paramount importance from a sanitary viewpoint inasmuch as it keeps the udders free from dirt and encourages dry-hand milking.

In the accompanying drawings in the various views of which like parts are similarly designated, Figure 1 is a perspective view of the floor of a stall of my improved construction, showing a cow in the position it occupies with relation to the gutter at the rear end of the same, and Figs. 2 and 3, perspective views showing modifications in the construction of the gutter.

The reference character 2 designates the floor surface of the stall, 3 the stanchion at the front end of the stall by which the animal is confined, and 4 the gutter running along the rear end of the stall to receive the excrement of the animal.

In the form of my invention shown in Fig. 1 the gutter has a sunken trough or bottom surface 5 of V-shaped section the sloping forward wall 6 of which is extended to the level of the floor surface of the stall.

In Fig. 2 the sloping surface $6^a$ of the gutter is of curvilinear form and the trough-portion $6^c$ of the same is sunken below the lower edge thereof.

The construction illustrated in Fig. 3 of the drawings, varies from that shown in Fig. 1 only in that the slanting surface $6^d$ of the gutter is made in the form of a reversed curve.

Having thus described my improved stall-construction, I desire it understood that the three forms shown in the drawings are merely exemplary of a number of modifications that can be made in the form and construction of the gutter, within the spirit of my invention as defined in the hereunto appended claim, and I also wish it understood that while my improved gutter construction is particularly adapted for use in connection with cow-stalls in dairy barns, it may be employed to advantage in stalls of horse stables and other animal shelters in which perfect sanitary conditions are the first requirement.

What I claim and desire to secure by Letters-Patent is:

In combination, an animal stall, a gutter rearward thereof, a surface sloping gradually from the rear end of the stall-floor to the gutter, and means at the head-end of the stall, adapted to fasten an animal therein so that its excrement must fall clear of the floor, said surface being sufficiently wide to prevent the animal from stepping rearwardly beyond it.

In testimony whereof I have affixed my signature.

RALPH MILLER.